(12) United States Patent     (10) Patent No.:   US 12,592,925 B2

Guionneau            (45) Date of Patent:     Mar. 31, 2026

---

(54) METHOD AND SYSTEM FOR AUTHENTICATING A USER ON AN IDENTITY-AS-A-SERVICE SERVER WITH A TRUSTED THIRD PARTY

(71) Applicant: BULL SAS, Les Clayes-sous-bois (FR)

(72) Inventor: Christophe Guionneau, Grenoble (FR)

(73) Assignee: BULL SAS, Les Clayes-sous-Bois (FR)

( * ) Notice: Subject to any disclaimer, the term of this patent is extended or adjusted under 35 U.S.C. 154(b) by 197 days.

(21) Appl. No.: 17/992,194

(22) Filed: Nov. 22, 2022

(65) Prior Publication Data

US 2023/0171254 A1    Jun. 1, 2023

(30) Foreign Application Priority Data

Nov. 29, 2021    (EP) .................................... 21306650

(51) Int. Cl.
*H04L 9/40*       (2022.01)

(52) U.S. Cl.
CPC ........ *H04L 63/0884* (2013.01); *H04L 63/105* (2013.01)

(58) Field of Classification Search
CPC .................... H04L 63/08–0892; H04L 63/105
See application file for complete search history.

(56) References Cited

U.S. PATENT DOCUMENTS

| | | | | |
|---|---|---|---|---|
| 7,406,594 B2 * | 7/2008 | Taruguchi | ........... | H04L 63/0823 |
| | | | | 713/155 |
| 7,685,630 B2 * | 3/2010 | Thapliyal | .............. | H04L 63/104 |
| | | | | 709/225 |

| | | | | |
|---|---|---|---|---|
| 2015/0373011 A1 * | 12/2015 | Subramanya | ......... | H04L 63/083 |
| | | | | 726/9 |
| 2018/0007059 A1 | 1/2018 | Innes et al. | | |
| 2018/0083977 A1 | 3/2018 | Murugesan et al. | | |
| 2018/0131685 A1 | 5/2018 | Deshpande et al. | | |
| 2018/0262909 A1 * | 9/2018 | Rotter | ................ | H04L 63/0861 |
| 2019/0333054 A1 | 10/2019 | Cona et al. | | |
| 2020/0007541 A1 | 1/2020 | Appiah et al. | | |

(Continued)

FOREIGN PATENT DOCUMENTS

KR      20060068531 A   *   6/2006

OTHER PUBLICATIONS

Vo, Tri Hoang, Woldemar F. Fuhrmann, and Klaus Peter Fischer-Hellmann. "Identity-as-a-Service (IDaaS): A Missing Gap for Moving Enterprise Applications in Inter-Cloud." INC. 2016. (Year: 2016).*

(Continued)

*Primary Examiner* — Madhuri R Herzog

(74) *Attorney, Agent, or Firm* — ARC IP Law, PC; Joseph J. Mayo

(57)        ABSTRACT

The invention relates to a method of authenticating, with an identity-as-a-service (IDAAS) server, a user of a plurality of users of a computer network. The method includes providing identification data for the user in an authentication web page of the IDAAS server, and validating an authentication request by verifying the identification data. The verifying is performed by another user, called a certifier, that is selected from the plurality of users of the computer network known to the IDAAS server and using the IDAAS server. The invention also relates to a computer program and an IDAAS server implementing such a method.

11 Claims, 2 Drawing Sheets

(56) References Cited

U.S. PATENT DOCUMENTS

2020/0213087 A1 * 7/2020 Mazzarella ........... G06F 16/285
2021/0392048 A1 * 12/2021 Olden ................. H04L 41/0816

OTHER PUBLICATIONS

European Search Report issued in EP21306650, dated May 2, 2022
(3 pages).
Kuperberg, et al., "Blockchain-Based Identity Management: A
Survey From the Enterprise and Ecosystem Perspective", IEEE
Transactions on Engineering Management, IEEE, vol. 67, No. 4,
Nov. 1, 2020.
Marti, et al., "Taxonomy of trust: Categorizing P2P reputation
systems", Computer Networks, vol. 50, No. 4, Mar. 15, 2006.

* cited by examiner

METHOD AND SYSTEM FOR AUTHENTICATING A USER ON AN IDENTITY-AS-A-SERVICE SERVER WITH A TRUSTED THIRD PARTY

This application claims priority to European Patent Application Number 21306650.9, filed 29 Nov. 2021, the specification of which is hereby incorporated herein by reference.

BACKGROUND OF THE INVENTION

Field of the Invention

The invention relates to a method for authenticating a user on an identity-as-a-service server, an IDAAS server, with a trusted third party. It likewise relates to a system implementing such a method.

The field of the invention is the field of authenticating a user with an IDAAS server, in particular with a view to accessing applications proposed in SaaS mode, also called web applications.

Description of the Related Art

Companies increasingly use "as a service" applications hosted in the cloud, called SaaS applications or web applications, in the application. These SaaS applications require user authentication. For various reasons, companies have transferred identity and access management to an identity-as-a-service (IDAAS) provider, hosted in the cloud, on a server external to the company's computer network, and called an IDAAS ("IDentity As A Service") server.

When a company user wishes to access a SaaS application, he must be authenticated with the IDAAS server, whether this is within or outside the company's computer network.

Certain authentication operations need to be approved by another person in the company, particularly when registering a new user, when registering a user for a new authentication method, or even when modifying user rights. However, the current solutions address this problem by transferring sensitive data relating to the company's structures to the IDAAS server, which, on the one hand, is cumbersome and time-consuming to manage over time, and on the other hand, does not address the computer security issues of the computer network.

One aim of at least one embodiment of the invention is to solve at least one of the above-mentioned shortcomings.

Another aim of at least one embodiment of the invention is to propose a solution for authenticating a user of a computer network with an IDAAS server, which is more simple and less time-consuming to manage over time.

It is also an aim of one or more embodiments of the invention to propose a more secure solution for authenticating a user of a computer network with IDAAS server with regard to the data of said computer network.

BRIEF SUMMARY OF THE INVENTION

At least one embodiment of the invention makes it possible to achieve at least one of the aforementioned aims with a method to authenticate, with an identity-as-a-service server, called IDAAS server, a user of a computer network, said method comprising the following steps:

proving identification data of said user in an authentication web page of said IDAAS server, and validating of said authentication request by verifying the identification data;

wherein the verification is performed by another user, called certifier, selected from users of said computer network known by said IDAAS server and using said IDAAS server.

Thus, at least one embodiment of the invention proposes to validate an authentication request with the IDAAS server formulated by a user of a computer network, such as a company network for example, by another user of said computer network using said IDAAS server, and therefore known to the IDAAS server. Thus, it is not necessary to transfer to the IDAAS server data relating to the structure of the computer network and that are sensitive in terms of the company's computer security.

Furthermore, in at least one embodiment, with the solution proposed, the authentication of a user with the IDAAS server is managed in a more simple and less time-consuming manner over time, as it is not necessary to update, over time, the data relating to the structure of the computer network. The solution proposed by one or more embodiments of the invention proposes to select the certifier not based on the structure of the computer network, but based on usage data of said IDAAS server by the users of said computer network, these data being available to said IDAAS server.

According to one or more embodiments of the invention, the validation step can comprise a step of transmitting to the certifier a link to a web page comprising at least some of the identification data to be verified.

Thus, in at least one embodiment, the certifier can display the user's identification data in order to verify them and confirm that the data are correct, or to detect any errors or fraud.

This link can be sent to an email address or a telephone number, or any other address of the certifier, or even in the form of a push notification in an application.

The web page can be a web verification page of the IDAAS server, or a web page of another web server communicating with the IDAAS server, etc.

According to one or more embodiments, when the identification data of the user are successfully verified by the certifier, the validation step can comprise a step of confirming, by said certifier, said identification data of the user with the IDAAS server.

The certifier can confirm the authenticity of the identification data provided by the user, for example by selecting a confirmation button displayed on a web verification page displaying said data and said confirmation button.

According to one or more embodiments, when the certifier validates the authenticity of the user's identification data, the validation step can be regarded as completed. The user is then authenticated following validation by the certifier.

According to one or more embodiments, when the identification data are confirmed by the certifier, the validation step may comprise the following steps:

receipt of a validation code sent by the IDAAS server, entry of said validation code into a web page of said IDAAS server.

For example, in at least one embodiment, the validation code can be received by the certifier, in order to be entered by the certifier or by the user. In this latter case, the certifier sends the code to the user.

Alternatively, or in addition, by way of at least one embodiment, the validation code can be received by the user, in order to be entered by the user or by the certifier. In this latter case, the user sends the code to the certifier.

For example, in at least one embodiment, the validation code can be entered by the certifier.

Alternatively, or in addition, by way of at least one embodiment, the validation code can be communicated by the certifier to the user such that the validation code can be entered by the user in addition to, or instead of, the certifier. To do this, at the step of providing identification data and awaiting the execution of the validation step, an event code can be provided to the user enabling him to resume authentication at a later time. Thus, when the user receives the validation code, from the IDAAS server or from the certifier, the user returns to the authentication page of the IDAAS server (or another IDAAS server page) and resumes the authentication procedure that he initiated by providing the event code. Then, the validation code is entered to finish the authentication process.

As indicated above, one or more embodiments of the invention proposes selecting the certifier from the other users of the IDAAS server and forming part of the same computer network as the user.

The choice of certifier from several users of the IDAAS server can be made based on different alternative or cumulative parameters.

According to one or more embodiments, the certifier can be selected by the IDAAS server.

In this case, the IDAAS server imposes the certifier to the user. At least one embodiment includes a higher security level as the user has no way of knowing the certifier before he is selected by the IDAAS server.

According to one or more embodiments, the certifier can be selected by the user from several options proposed by the IDAAS server.

At least one embodiment offers the user greater flexibility. For example, the user can select the most suitable certifier to validate the identification data that he has provided, both in terms of knowledge of these data, but also in terms of validation time.

According to one or more embodiments, the certifier can be selected based on a user type from the users of the computer network known to the IDAAS server.

In at least one embodiment, the user selected as being a certifier can be a user declared as an administrator or superadministrator. This selection criterion can notably be used when implementing the solution proposed by one or more embodiments of the invention, for example temporarily.

In at least one embodiment, a group of users can be declared as administrators or superadministrators. The certifier can only be selected from this group of users.

According to one or more embodiments, the certifier can be selected based on a confidence score calculated for several, and in particular for all the, users of the computer network known to the IDAAS server.

The method according to one or more embodiments of the invention can comprise a step of calculating and/or a step of updating said confidence score for each user.

For at least one user, the confidence score of said user can be calculated based on any combination of the following data:

activity data for said user. For example, in at least one embodiment, the confidence score can increase when the activity data reflect a stable or almost constant activity: when the same browser is always used, the same authentication method is always used, the same IP address is always used, the same times, etc. For example, the confidence score can decrease in the opposite case;

authentication methods used. For example, in at least one embodiment, the confidence score can increase with the level of authentication methods used, or when the same authentication method is always used. For example, the confidence score can decrease with the level of authentication methods used, or when the authentication method is changed frequently;

authentication methods registered. For example, in at least one embodiment, the confidence score can vary proportionally to the security level of the authentication methods to which he is registered;

etc.

Alternatively, or in addition, by way of at least one embodiment, the certifier can be selected based on an availability score calculated for several, and in particular for all, users of the computer network known to the IDAAS server.

The method according to one or more embodiments of the invention can comprise a step of calculating and/or a step of updating an availability score, corresponding, for example, to an availability probability relating to the user.

For at least one user, the availability score of said user can be calculated based on any combination of the following data:

frequency of access to web applications in the past, data relating to hour of access to web applications in the past, date of access to web applications in the past, validation durations in the past when this user was selected as a certifier, etc.

At least one embodiment of the invention can be used to perform authentication in various situations or configurations.

For example, in at least one embodiment, the authentication may be an authentication to register a new user, for example when a new user is created on the computer network.

The authentication may be to authenticate a known user in order to register said user to a new authentication method, for example a less strict authentication method, or an authentication method using a new device or new contact information.

The authentication may be to authenticate a known user in order to modify a computer privilege for said user, such as to modify an access right, an access to new data, to modify a user type, etc.

According to one or more embodiments of the invention, a computer program is proposed comprising computer instructions, which when executed by a computer, implement the steps of the method according to at least one embodiment of the invention.

The computer program can be in machine language, in C, C++, JAVA, Python, and more generally any type of computer language.

The computer program can be a single program, or a set of several programs communicating together. For example, in at least one embodiment, the computer program can comprise a server module executed at the level of the IDAAS server and a client module executed at the level of a device used by the user to perform the authentication. For example, in one or more embodiments, the client module can comprise a web client or a web browser to access the authentication web page of the IDAAS server. For example, the server module can be, or can comprise, a web page server comprising a form for providing identification data.

According to at least one embodiment of the invention, an identity-as-a-service server, also called an IDAAS server, is proposed, configured to authenticate a user by the method according to one or more embodiments of the invention.

BRIEF DESCRIPTION OF THE DRAWINGS

Other benefits and features shall become evident upon examining the detailed description of an entirely non-limiting embodiment, and from the enclosed drawings in which.

DETAILED DESCRIPTION OF THE INVENTION

It is clearly understood that the one or more embodiments that will be described hereafter are by no means limiting. In particular, it is possible to imagine variants of the one or more embodiments of the invention that comprise only a selection of the features disclosed hereinafter in isolation from the other features disclosed, if this selection of features is sufficient to confer a technical benefit or to differentiate the one or more embodiments of the invention with respect to the prior state of the art. This selection comprises at least one preferably functional feature without structural details, or only has a portion of the structural details if that portion is only sufficient to confer a technical benefit or to differentiate the one or more embodiments of the invention with respect to the prior state of the art.

In the figures, the same reference has been used for the features that are common to several figures.

Figure 1:
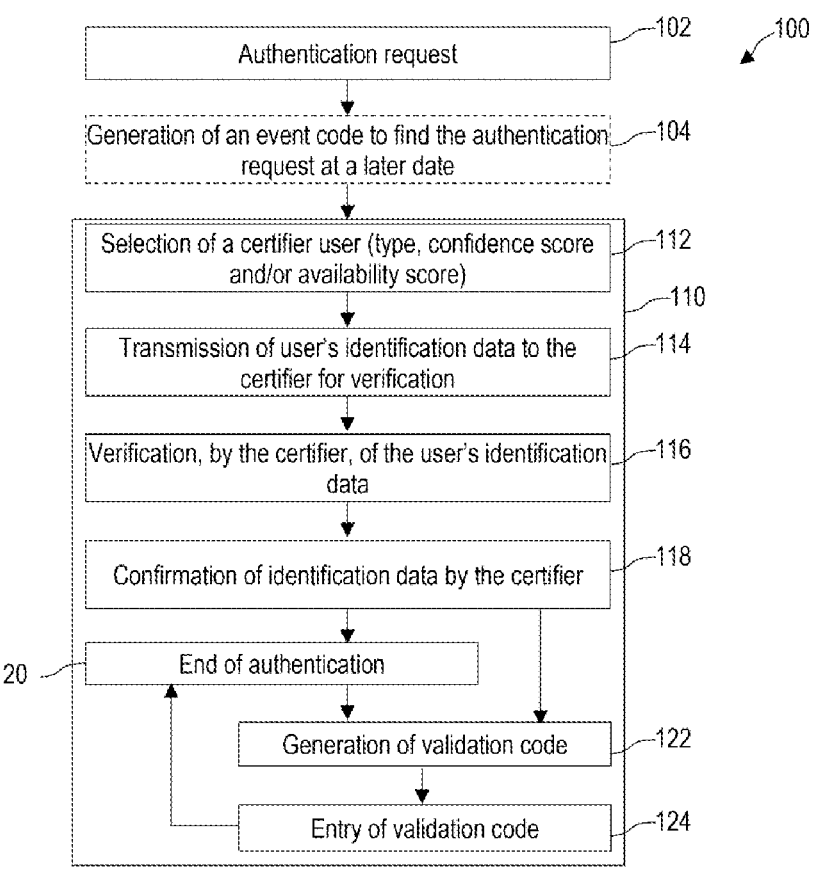
FIG. 1 is a schematic depiction of an authentication method according to one or more embodiments of the invention.

FIG. 1 is a schematic depiction of an authentication method according to one or more embodiments of the invention.

The method 100, depicted in FIG. 1, can be implemented in order to authenticate a user of a given computer network, for example a computer network, for authorizing said user to access a SaaS application, or web application, hosted on an application server located outside the computer network.

The method 100 comprises a step 102 of requesting authentication formulated by a user of the computer network to the IDAAS server. The authentication request can be formulated from the computer network, or outside the computer network.

The authentication request can be formulated, for example, by accessing an authentication web page of the IDAAS server by virtue of a browser executed by a user device, such as a tablet or a computer for example.

The authentication request is formulated by providing identification data requested by the IDAAS server, for example using a form displayed on the authentication web page of the IDAAS server: surname, first name, date of birth, home address, etc. After having entered the identification data, the user confirms their authentication request, for example by validating the identification data entered, and submits the form.

At the time of submission, optionally, the IDAAS server can take a device fingerprint of the browser by collecting all the data available such as the type of browser, the operating system, the browser geolocation, the IP address, etc.

At the end of step 102, the user can remain logged in the IDAAS authentication page. Alternatively, in one or more embodiments, during a step 104, an event code is generated by the IDAAS server, associated with the authentication request, and enabling the user to find their authentication request at a later time.

Then, a step 110 of validating the authentication request is performed.

During step 112, a certifier user is selected. This certifier user forms part of the same computer network as the user who formulated the authentication request and is known to the IDAAS server.

According to one or more embodiments, the certifier can be selected and imposed by the IDAAS server. Alternatively, in at least one embodiment, the certifier can be selected by the user from several options proposed by the IDAAS server.

The certifier can be selected based on at least one of the following criteria:

a user type: normal user, administrator, superadministrator, declared with the IDAAS server. The user type declared can be completely independent of the company's structure such that it does not prejudge, and provides no information relating to, the structure of the company's computer network;

a confidence score associated with each user;

an availability score associated with each user;

and this for each of the users of the computer network known to the IDAAS server.

According to at least one embodiment, the confidence score can be calculated and/or updated for each user, by the IDAAS server, such that:

it increases when the user registers for high level methods, it increases when the user mainly authenticates with strong authentication methods, it increases when the user varies very little: always the same browser, always the same authentication methods, always the same IP addresses or the same technical characteristics and hours, it decreases when the user changes authentication method for a less reliable method, it decreases when the user frequently changes authentication methods (even high methods), and/or it decreases when the user is variable: change of browser, change of IP address or technical features or hours.

According to at least one embodiment, the availability score can be calculated and/or updated for each user, by the IDAAS server, based on;

frequency of accessing web applications in the past, hourly data relating to accessing web applications in the past, dates of accessing web applications in the past, and/or validation durations in the past when this user was selected as a certifier.

During a step 114, a link is sent to the certifier user. This link includes some or all of the identification data entered by the user, for example the entire form completed by the user during step 102. This link can be sent in an email, or an SMS, or even in the form of a push notification in an application.

During a step 116, the certifier user verifies the identification data, for example by accessing the page the link of which was sent to him during step 114.

During a step 118, where applicable, the certifier user confirms the veracity of the identification data entered by the user, for example by pressing the validation button provided for this purpose.

According to at least one embodiment, the authentication is then confirmed and ended during a step 120, such that the user is authenticated successfully.

According to at least one embodiment, a validation code is generated during a step 122 performed after step 118. This validation code can be displayed or sent to the certifier, or directly to the user.

During a step 124, this validation code is entered in a field of a web page of the IDAAS server in order to end the authentication. Either the code is entered by the certifier, or it is entered by the user. If in step 122 the validation code is received by the certifier, the latter communicates it via secure means to the user who enters it into the web page of the IDAAS server, optionally after having retrieved his/her authentication request using the event code generated in step 104.

Authentication is then ended and the user is authenticated successfully.

Figure 2:
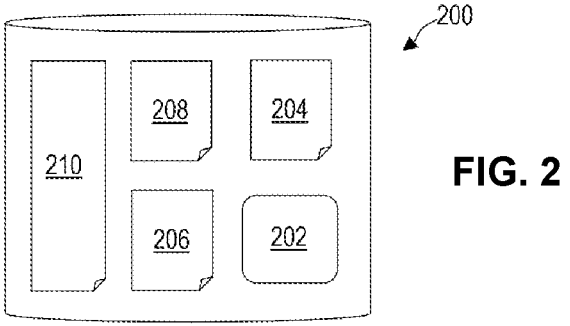
FIG. 2 is a schematic depiction of an authentication server according to one or more embodiments of the invention.

FIG. 2 is a schematic depiction of an IDAAS server according to one or more embodiments of the invention.

The IDAAS server 200, depicted in FIG. 2, can be used to implement a method according to one or more embodiments of the invention, and in particular the method 100 in FIG. 1.

The IDAAS server 200 comprises an authentication module 202 provided to:

- present an authentication page to a browser executed by a user device,
- receive identification data entered by the user, for example in the form of a completed form, and optionally data concerning the user device by taking a fingerprint of the browser used to provide the identification data,
- submit identification data entered by the user to a certifier user for validation, and
- receive validation from the certifier user, where applicable.

For example, in at least one embodiment, the authentication module 202 can be configured to perform any combination of the steps of the method 100 in FIG. 1 performed by the IDAAS server.

The server 200 further comprises a module 204 for calculating and updating a confidence score for each user, for example based on data listed hereinbefore.

The server 200 further comprises a module 206 for calculating and updating an availability score for each user, for example based on data listed hereinbefore.

The server 200 further comprises a module 208 for selecting a certifier user, or several certifier users to be proposed to the user based on:

- a user type,
- a confidence score, and/or
- an availability score.

The server 200 further comprises a list 210 of users, each being able to be selected as a certifier and belonging to the same computer network as the user requesting authentication.

At least one of the modules 202-208 may be a software module or a computer program.

At least two of the modules 202-208 may be independent.

At least two of the modules 202-208 may be integrated into the same module.

Figure 3:
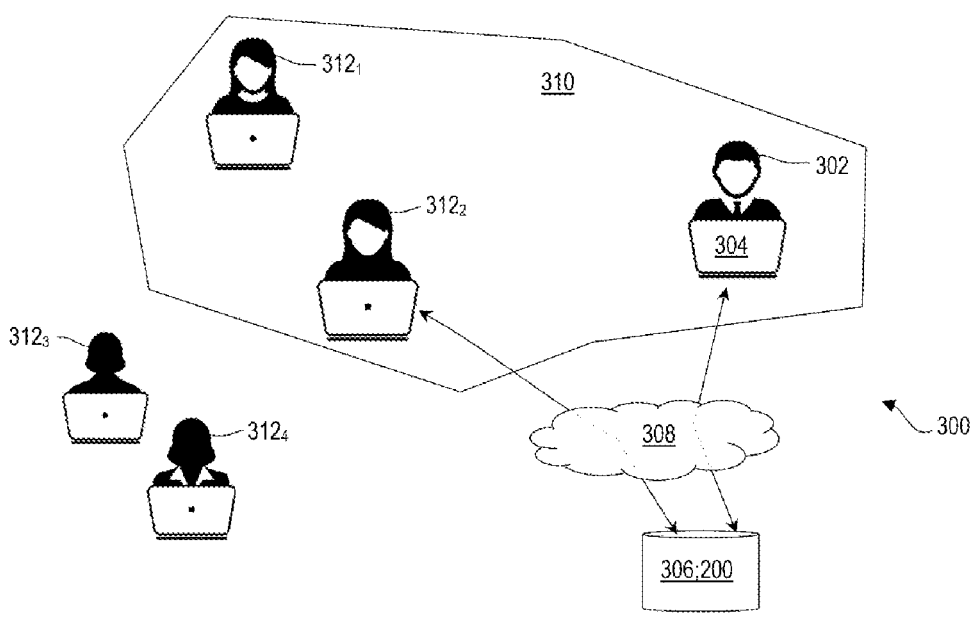
FIG. 3 is a schematic depiction of an authentication example according to one or more embodiments of the invention.

FIG. 3 is a schematic representation of an example authentication configuration that may be performed by one or more embodiments of the invention.

In the configuration 300 depicted in FIG. 3, a user 302 with his/her user device 304 can request an authentication with an IDAAS server 306, which may be the server 200 in FIG. 2, via a communication network 308 such as the Internet.

The user 302 belongs to a computer network 310, such as for example a company network. In the configuration 300 shown, the user 302 is located on the company network 310 at the time of the authentication request. Of course, in other configurations, the user 302 requesting authentication may be located outside the computer network 310.

The computer network 310 also comprises other users 312 known by the IDAAS server 306 and using the IDAAS server 306. In the example in FIG. 3, by way of at least one embodiment, without loss of generality, only four other users $312_1$-$312_4$ are depicted. In the example depicted, by way of at least one embodiment, at the time of the authentication request, the users $312_1$ and $312_2$ are located on the computer network 310 and the users $312_3$ and $312_4$ are located outside the computer network 310.

Any one of the users $312_1$-$312_4$ can be selected as a certifier user, either by the IDAAS server or by the user 302 at the suggestion of the IDAAS server 306. In the example in FIG. 3, by way of at least one embodiment, the certifier selected is the user $312_2$.

The certifier $312_2$ verifies and, where applicable, validates the identification data entered by the user 302 and sent to him by the IDAAS server 306.

Thus, the user 302 is authenticated with the support of another user of the computer network to which said user 302 belongs and who is known to the IDAAS server 306.

Of course, these examples are only given by way of specific examples and one or more embodiments of the invention are not limited to the examples given above. Numerous variants and embodiments can be envisaged for the examples given above without departing from the scope of the invention as defined in the main claims.

The invention claimed is:

1. A method of authenticating, with an identity-as-a-service (IDAAS) server, a user of a plurality of users of a computer network, said method comprising:

receiving an authentication request formulated by said user to said IDAAS server;

providing identification data for said user in an authentication web page of said IDAAS server, and validating said authentication request formulated by said user by verifying the identification data;

wherein said verifying the identification data for said user is performed by another user, wherein said another user is a certifier user selected from said plurality of users of said computer network, wherein said certifier user is part of said computer network as said user that formulated said authentication request, is known to said IDAAS server, is using the IDAAS server, and is previously authenticated with said IDAAS server to access said computer network;

the IDAAS server is configured to recognize the certifier user and provide access to a verification web page for verifying the identification data, wherein the IDAAS server is configured to recognize said certifier user before providing access to said verification web page; and wherein said providing access to the verification web page comprises transmitting, to the certifier user, a link to the verification web page comprising at least some of the identification data to be verified.

2. The method according to claim 1, wherein, when the identification data of the user is successfully verified by the certifier user, the validating comprises confirming, by said certifier user, said identification data for the user with the IDAAS server.

3. The method according to claim 2, wherein, when the identification data is confirmed by the certifier user, the validating further comprises receiving a validation code sent by the IDAAS server, entering said validation code into a web page of said IDAAS server.

4. The method according to claim 1, wherein the certifier user is selected by the IDAAS server.

5. The method according to claim 1, wherein the certifier user is selected by the user from several options proposed by the IDAAS server.

6. The method according to claim 1, wherein the certifier user is selected based on a user type from the plurality of users of the computer network known to the IDAAS server, and wherein said plurality of users comprise superadministrator type users.

7. The method according to claim 1, wherein the certifier user is selected based on a confidence score calculated for all users of said plurality of users of the computer network known to the IDAAS server.

8. The method according to claim 1, wherein the certifier user is selected based on an availability score calculated for all users of the plurality of users of the computer network known to the IDAAS server.

9. The method according to claim 1, wherein said authentication request comprises one or more of an authentication in order to register a new user;

authentication of a known user in order to register said known user to a new authentication method;

authentication of a known user in order to modify a computer privilege for said known user to modify an access right.

10. A non-transitory computer program product having stored thereon a computer program comprising executable computer instructions, which when executed by a computer, cause the computer to carry out a method of authenticating, with an identity-as-a-service (IDAAS) server, a user of a plurality of users of a computer network, said method comprising:

receiving an authentication request formulated by said user to said IDAAS server;

providing identification data for said user in an authentication web page of said IDAAS server, and validating said authentication request formulated by said user by verifying the identification data;

wherein said verifying the identification data for said user is performed by another user, wherein said another user is a certifier user selected from said plurality of users of said computer network, wherein said certifier user is part of said computer network as said user that formulated said authentication request, is known to said IDAAS server, is using the IDAAS server, and is previously authenticated with said IDAAS server to access said computer network, the IDAAS server is configured to recognize the certifier user and provide access to a verification web page for verifying the identification data, wherein the IDAAS server is configured to recognize said certifier user before providing access to said verification web page; and wherein said providing access to the verification web page comprises transmitting, to the certifier user, a link to the verification web page comprising at least some of the identification data to be verified.

11. An authentication system configured to authenticate a user of a plurality of users of a computer network, wherein said authentication system comprises:

an identity-as-a-service (IDAAS) server that comprises computer-executable instructions executed by a computer to direct said IDAAS server to receive an authentication request formulated by said user to said IDAAS server;

provide identification data for said user in an authentication web page of said IDAAS server, and validate said authentication request formulated by said user by verifying the identification data;

wherein said verifying the identification data for said user is performed by another user, wherein said another user is a certifier user selected from said plurality of users of said computer network, wherein said certifier user is part of said computer network as said user that formulated said authentication request, is known to said IDAAS server, is using the IDAAS server, and is previously authenticated with said IDAAS server to access said computer network, the IDAAS server is configured to recognize the certifier user and provide access to a verification web page for verifying the identification data, wherein the IDAAS server is configured to recognize said certifier user before providing access to said verification web page; and wherein said providing access to the verification web page comprises transmitting, to the certifier user, a link to the verification web page comprising at least some of the identification data to be verified.

* * * * *